United States Patent
Arends et al.

(10) Patent No.: US 7,488,458 B2
(45) Date of Patent: Feb. 10, 2009

(54) APPARATUS FOR CONVERTING A HYDROCARBON-CONTAINING FLOW OF MATTER

(75) Inventors: Gesine Arends, Gerlingen (DE); Peter Riegger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 10/612,798

(22) Filed: Jul. 2, 2003

(65) Prior Publication Data

US 2004/0005249 A1    Jan. 8, 2004

Related U.S. Application Data

(63) Continuation-in-part of application No. 10/396,144, filed on Mar. 25, 2003, now abandoned.

(30) Foreign Application Priority Data

Mar. 28, 2002    (DE)    ................. 102 13 891

(51) Int. Cl.
    B01J 8/04    (2006.01)
    C01B 3/38    (2006.01)
(52) U.S. Cl. .............. 422/190; 422/191; 422/193; 422/198; 422/200; 422/202; 422/204; 422/211; 48/61; 429/12; 429/19
(58) Field of Classification Search ............. 48/127.9, 48/94
    See application file for complete search history.

(56) References Cited

U.S. PATENT DOCUMENTS

| 4,909,808 A | 3/1990 | Voecks ............. 48/94 |
| 6,432,378 B1 * | 8/2002 | Autenrieth et al. ....... 423/648.1 |

FOREIGN PATENT DOCUMENTS

| DE | 19721630 C1 * | 2/1999 |
| EP | 275549 A1 * | 7/1988 |
| EP | 1 094 031 A1 | 4/2001 |
| JP | 62074448 A * | 4/1987 |
| JP | 63049249 A * | 3/1988 |
| JP | 63289775 A * | 11/1988 |
| JP | 02120205 A * | 5/1990 |
| JP | 06227801 A * | 8/1994 |

* cited by examiner

*Primary Examiner*—Jennifer A Leung
(74) *Attorney, Agent, or Firm*—Michael J. Striker

(57) ABSTRACT

An apparatus (10) for converting a hydrocarbon-containing flow of matter (4) to a hydrogen-enriched fluid flow (10) includes a heating apparatus (5) for production of a heating stream (6), whereby the flow of matter (4) is converted to the hydrogen-enriched fluid flow (10) in a first converter (2) as well as in a second converter (3) arranged behind the first converter in a flow direction. A heating element (8) that is flowed-through by the heating stream (6) is provided for heating at least one of the two converters (2, 3). The invention provides an improved system efficiency, in that a disadvantageous cooling of the second converter (2) is effectively avoided. This is achieved according to the present invention in that at least in one operating phase, the heating stream (6) flows to the second converter (3) completely in a counterflow to the flow of matter (4).

11 Claims, 2 Drawing Sheets

APPARATUS FOR CONVERTING A HYDROCARBON-CONTAINING FLOW OF MATTER

CROSS-REFERENCE

The present application is a continuation-in-part application of application Ser. No. 10/396,144, filed Mar. 25, 2003, now abandoned, which claimed priority of DE 102 13 891.5, filed Mar. 28, 2002. This German Patent Application, whose subject matter is incorporated here by reference, provides the basis for a claim of priority of invention for the present application under 35 U.S.C. 119 (a)-(d).

BACKGROUND OF THE INVENTION

The present invention relates to an apparatus for converting a hydrocarbon-containing flow of material into a hydrogen-enriched fluid flow with a heating device for production of a heating stream or hot gas stream used for heating purposes.

Fuel cells are electrochemical transformers of chemical energy into electrical energy. In many cases, one's goal is to convert hydrogen-rich fuel for the fuel cell unit from hydrocarbonous material, such as natural gas, gasoline, diesel, methanol or the like. In this connection, a corresponding apparatus for converting the hydrocarbon to a hydrogen-rich substance is necessary.

For example, the conversion takes place by means of reforming, or steam reforming. The steam reform of hydrocarbons is generally endothermic. The supply of the heat of reaction takes place usually through a burner. A heat flow produced hereby, that is, hot flue gas, can be used for heating of the matter flow in a first stage or converter, whereby, likewise, already in this stage, the matter flow is at least partially converted.

In addition, particulary, the heating flow, or flue gas, of the burner as well as the heat radiation coming from the burner can be used for heating of a second, hotter stage or reactor stage of the reformer.

With the two-stage steam reformers known up to this point, according to the disclosure of B. Vogel et al: "Hydrogen Generation Technologies for PEM Fuel Cells", Proceedings of the Fuel Cell Seminar, Palm Springs, November 1998, the flue gas of a burner is already used for educt preheating as well as for heating of the reactor stages. In this example, an additional heat exchanger is placed before the reformer for using the residual heat of the flue gas.

A disadvantage of such steam reformers, however, is that at the side of the reaction zone facing away from the burner, or the second stage, the flue gas flow co-currently to the educt stream, so that among other things, the flue gas cooled by educt preheating might be brought into heating contact with hot reactor zones. Thus, an undesired, disadvantageous heat transfer from the reactor stage into the flue gas can take place, so that the reforming reaction in this reaction stage is affected disadvantageously.

SUMMARY OF THE INVENTION

One object of the present invention, in contrast, is to provide an apparatus for converting a hydrocarbon-containing matter flow or current to a hydrogen-enriched fluid flow or current with a heating device for production of a heating stream, whereby the educt flow is converted in a first converter, as well as in a second converter arranged behind the first converter in the flow direction, and a first heating element that is able to be flowed through by the heating stream is provided for warming the two converters, which in contrast to the state of the art, has an improved system efficiency, whereby a disadvantageous cooling of the second converter is effectively prevented.

This object is resolved with a device of the above-described type, in accordance with the present invention.

Accordingly, the inventive apparatus illustrates that at least in one operating phase, the heating stream next to the second converter is completely in a counterflow to the heating gas.

With the assistance of these features, the transfer of heat from a relatively hot heating stream onto or into a second converter unit is markedly improved. At the same time, a cooling of a similarly hot region of the second converter is effectively prevented, so that, in particular, the system efficiency of the device can be significantly improved.

In an advantageous variation of the invention, in at least one operating phase, the heating stream flows completely in a counterflow to the flow of matter in the first and second converters. Thus, the heat transfer from a relatively hot heating stream to the likewise somewhat colder matter flow, or educt matter flow, is also improved. Thereby, the broadest use of the heat energy of the heating stream for heating the matter flow takes place.

In a particular further embodiment of the invention, at least one second heating element that can be flowed-through by the heating stream is provided for heating one of the two converters in a start phase. With the assistance of these characteristics, an advantageous, particularly fast heating of at least one of the two converters, in particular, the second converter or reactor stage, in a start or cold start phase is possible. For example, the first heating element is arranged on one side of one of the two converters and the second heating element on a side of one of the two converters that is opposite to this first side. In this manner, an increase of the heat-transmitting surface, and therewith, an improvement of the heat transmission from the heating stream to the matter flow, are possible.

Essentially, for improving the heat transmission, a further increase of the heat-transfer surface area is possible by means of a corresponding profiling or the like. It is particularly advantageous to use materials with advantageous heat-transfer properties.

Preferably, the second heating element is arranged between the two converters. In this manner, a particularly fast heating of the two converters in the start phase without great expenditure is able to be realized.

Advantageously, an inlet opening and/or outlet opening of the first and/or second heating element has at least one apportioning element for apportioning of the heating stream. With the help of a corresponding apportioning element, in particular, as a function of the respective operating state, that is, for example, in the "normal" operating phase and/or in the start phase, an advantageous apportioning of the heating stream, or its volume, and therewith, an apportioning of the heating energy can take place. Possibly, the apportioning element is formed as a flap, valve, or the like.

Preferably, at least one control unit for controlling the apportioning element is provided. Likewise, for example, by actuation of the apportioning element, in particularly, by a complete opening or closing of the inlet and/or outlet opening, the through-flow of at least one or both heating elements can be effectively decreased or prevented. Possibly, the heat transfer can be substantially omitted by means of the corresponding heating element.

Preferably, the heating element is formed at least in the operating phase as an isolation element. For example, an advantageous thermal separation of the two converters is realized by closing of the inlet and/or outlet opening of the second heating element, which is preferably located between the two converters. In this manner, during the operating phase, a relevant heat transfer from the second converter or particularly hot reactor zones to the somewhat colder first converter or preheating state and/or to the likewise somewhat cooled heating stream can be substantially prevented.

Generally, one or both converters can have a catalytically active material for advantageously converting the matter flow. Possibly, both converters have different catalytically active materials.

In one advantageous embodiment of the invention, both converters and/or both heating elements are arranged approximately coaxially to one another. In this manner, a relatively compact structure is realizable.

Preferably, the heating apparatus is arranged approximately coaxial to the converters and/or heating elements. With the aid of these features, an advantageous use of the heat energy of the heating apparatus can be realized.

Advantageously, the heating apparatus is arranged in the region of the relatively hot, second converter. In this manner, the second converter takes up the heat energy from the heating apparatus by means of a heat conduction as well as heat radiation.

In an advantageous variation of the invention, the heating apparatus is arranged approximately centrally to the converters and/or heating elements. In this manner, a particularly compact structure and thus, a relatively minimal heating loss according to the invention is realizable. In addition, a particularly uniform temperature distribution over the cross section of the apparatus according to the invention is realizable.

Preferably, the apparatus has a cylindrical structure with a heating apparatus placed on the outside or inside.

In an advantageous manner, an apparatus according to the invention, in particular, a steam reformer, is provided in a fuel cell assembly for energetic utilization of the hydrogen-enriched fluid flow. One or more treatment units for treatment of the fluid flow may be provided between the apparatus of the present invention and the fuel cell assembly. Corresponding fuel cell assemblies are used, for example, in motor vehicles, combined heat and power assemblies, or the like.

DETAILED DESCRIPTION OF THE PREFERRED EMBODIMENTS

One embodiment of the present invention will be described in greater detail with reference to FIG. 1.

Figure 2:
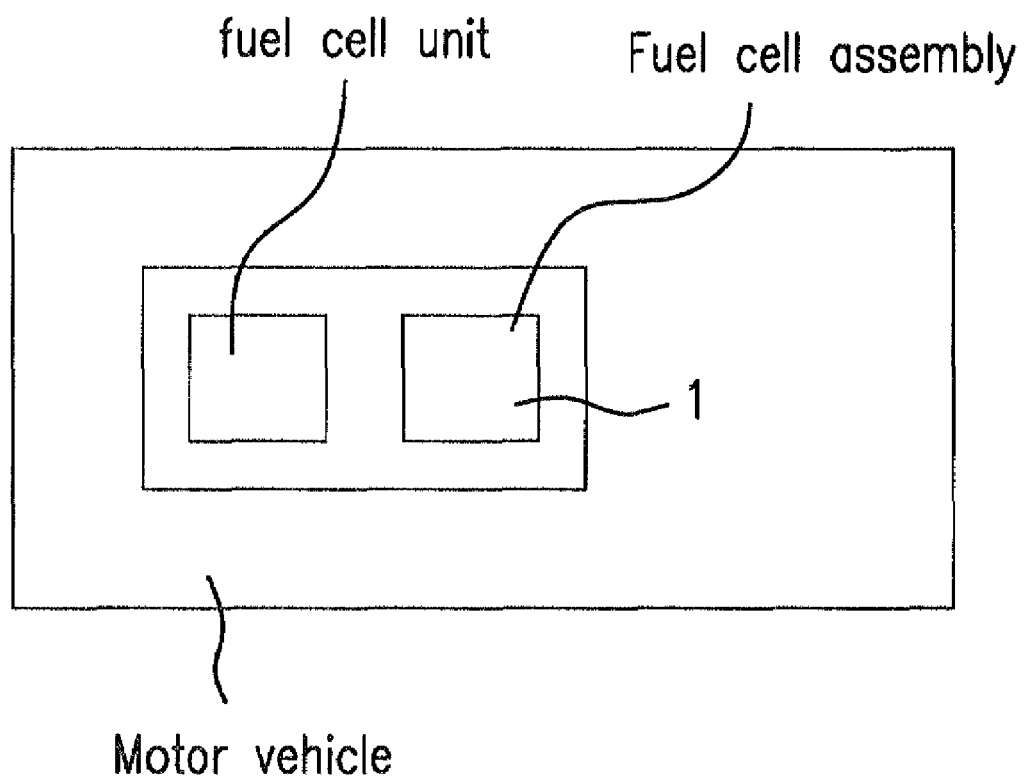
FIG. 2 is the schematic illustration of a motor vehicle provided which is provided with a fuel cell assembly including a fuel cell unit and a steam reformer according to the present invention.

A motor vehicle provided with a fuel cell assembly, which includes fuel cell unit and a reformer is schematically shown in FIG. 2.

Figure 1:
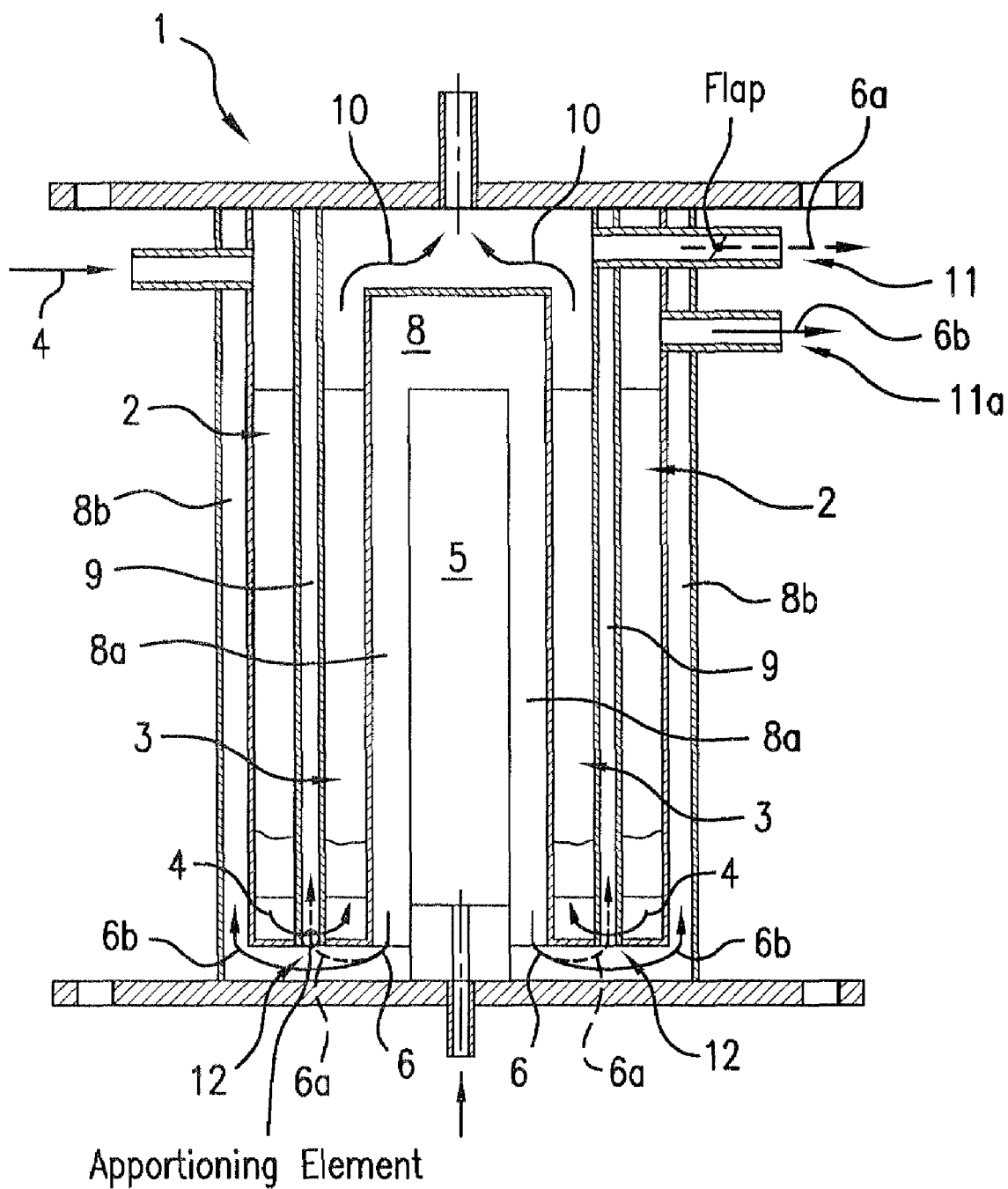
FIG. 1 is a schematic illustration of a cross section through a cylindrical reformer according to the present invention.

FIG. 1 schematically illustrates the cylindrical reformer according to the present invention in a cross section.

A two-stage steam reformer 1 has a first reforming stage 2 and a second reforming stage 3, or reactor 3. For heating the steam reformer 1, a burner 5 is provided, which is disposed approximately centrally in a cylindrical steam reformer 1. For example, in the burner 5, natural gas 7 or the like is, possibility catalytically, combusted. Flue gas, or burner exhaust 6, is used for heating the two reforming stages 2 and/or 3.

According to the invention, the flue gas 6 flows through a flue gas chamber 8 in a "normal" operation situation. The flue gas chamber 8 includes the flue gas chamber 8a in the region of the burner 5 and the flue gas chamber 8b in a region facing away from the burner 5, or the second reactor stage 3.

In a first stage, an educt flow is preheated. This can contain catalytically active material, so that, possibly, first pre-reactions for conversion of the educt 4 can take place.

In a region of the flue gas chamber 8b, the heat transfer from the flue gas 6 onto the educt material flow 4 take place mainly by heat conduction. According to the invention, a complete counterflow of the flue gas flow 6 in relation to the educt material flow 4 is hereby realized.

The heat energy of the burner 5 is transmitted on the second, hotter reforming stage 3 in the region of the flue gas chamber 8a by means of heat radiation as well as a heat conduction to the educt material flow 4, so that, in this manner, in particular, the endothermic steam reforming of the hydrocarbon-containing educt matter flow 4, as well as of possible intermediate products produced in the first stage 2, takes place. Generally, the second reforming stage 3 includes catalytically active material (not shown).

In a start phase or cold start phase, the flue gas flow 6 can be lead into a gap 9. The flue gas flow 6 hereby can be separated, for example, into a flue gas partial flow 6a and a flue gas partial flow 6b. During this particular operating state, at least the second converter 3, or the second reactor stage 3, is operated at least partially co-currently, that is, the flue gas partial flow 6a and the educt flow 5 flow in the same direction.

At the same time, the first reactor stage 2, by means of the flue gas partial flow 6a as well as the flue gas partial flow 6b, is operated in counterflow with reference to the educt flow 4. According to the invention, the heating-transmitting surfaces are significantly enlarged through the gap 9, so that, in this manner, a particularly fast heating of the reformer 1 can take place in the cold start phase. Thus, in an advantageous manner, the heating time of the reformer 1 is shortened substantially.

In the "normal"operating phase,the reformer1 is operated, such that in the region of an outlet opening 11, through which the flue gas partial flow 6a flows out of the reformer 1, a flap for closing the outlet opening 11 is provided. The corresponding flap is controlled, for example, by means of a control unit. The latter can detect an operating temperature of the reformer 1 particularly by means of temperature sensors. Alternatively, also the illustrated flap also can be closed in the region of the outlet opening 11 after a time period provided by the control unit.

In the "normal" operating phase, the flue gas 6a accumulated in the gap 9 forms a thermal isolation layer between the reactor stages 2 and 3. In this manner, a thermal separation of the relatively hot chamber 3 from the somewhat colder chamber 2 of the reformer 1 is realized in an advantageous manner.

Alternatively, or in combination hereto, a flap, a valve, or the like can be placed in the region of an inlet opening 12 of the gap 9. In this manner, the formation of a thermal isolation layer 9 during the "normal" operating phase is likewise realizable when the flap in the region of the inlet opening 12 is closed.

The reformat 10 flowing out of the reformer 1 can be supplied, for example, in a non-illustrated manner to a fuel cell assembly for production of electrical energy.

Preferably, the steam reforming takes place with temperatures of approximately 800° C., whereby the burner 5 produces temperatures of approximately 1000° C. and 1200° C., so that a detrimental $NO_x$-formation is substantially prevented.

It will be understood that each of the elements described above, or two or more together, may also find a useful application in other types of constructions differing from the types described above.

While the invention has been illustrated and described herein as an apparatus for converting a hydrocarbon-containing flow of matter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus (1) for converting a flow of matter (4) containing hydrocarbons to a hydrogen-enriched fluid flow (10), comprising:
    a heating apparatus (5) for production of a heating stream (6);
    a first converter (2) and a second converter (3) arranged behind said first converter in a flow direction to the hydrogen-enriched fluid flow (10), wherein each of the first converter and the second converter is configured for reforming hydrocarbons to hydrogen, and wherein the flow of matter (4) containing hydrocarbons is converted in the first converter first and in the second converter further to the hydrogen-enriched fluid flow;
    a first heating element (8) provided with an inlet opening and an outlet opening that is flowed-through by the heating stream for heating at least one of the first and second converters (2, 3), wherein the first heating element comprises a first flue gas chamber (8a) for heating the second converter (3) and a second flue gas chamber (8b) downstream from the first flue gas chamber for heating the first converter (2), and wherein the heating stream (6) that flows through the first flue gas chamber (8a) flows completely in a counterflow direction to the flow of matter (4) in the second converter (3);
    a second heating element (9) provided with an inlet opening (12) and an outlet opening (11) that is flowed-through by the heating stream (6) for heating at least one of the first and second converters, wherein the second heating element is located between the first and second converters; and
    flaps for closing each of the inlet opening (12) and the outlet opening (11) of the second heating element, such that the second heating element (9) forms a thermal separation between the first converter (2) and the second converter (3) when the inlet opening (12) and the outlet opening (11) are closed by the flaps during at least one operating phase.

2. The apparatus (1) according to claim 1, wherein the heating stream (6) that flows through the second flue gas chamber (8b) flows completely in a counterflow direction to the flow of matter (4) in the first converter (2).

3. The apparatus (1) according to claim 1, wherein the second heating element (9) heats at least one of the first converter (2) and the second converter (3) when the flaps at the inlet opening (12) and the outlet opening (11) are opened during a start phase.

4. The apparatus (1) according to claim 3, wherein the inlet opening and/or outlet opening of the first heating element (8) is further provided with a flap for closing the inlet opening and/or outlet opening of the first heating element (8).

5. The apparatus (1) according to claim 4, wherein at least one control unit is provided for controlling the flaps.

6. The apparatus (1) according to claim 3, wherein the first and second converters (2, 3) and/or the first and second heating elements (8, 9) are arranged approximately coaxially to one another.

7. The apparatus (1) according to claim 3, wherein the heating apparatus (5) is arranged approximately coaxially to the converters (2, 3) and/or the heating elements (8, 9).

8. The apparatus (1) according to claim 3, wherein the heating apparatus (5) is arranged approximately centrally to the converts (2, 3) and/or the heating elements (8, 9).

9. A fuel cell assembly, comprising:
    a fuel cell unit and an apparatus (1) for converting a hydrocarbon-containing flow of matter (4) to a hydrogen-enriched fluid flow (10), wherein the apparatus (1) comprises a heating apparatus (5) for production of a heating stream (6);
    a first converter (2) and a second converter (3) arranged behind said first converter in a flow direction to the hydrogen-enriched fluid flow (10), wherein each of the first converter and the second converter is configured for reforming hydrocarbons to hydrogen, wherein the flow of matter containing hydrocarbons (4) is converted in the first converter first and in the second converter further to the hydrogen-enriched fluid flow; a first heating element (8) provided with an inlet opening and an outlet opening that is flowed-through by the heating stream for heating at least one of the first and second converters (2, 3), wherein the first heating element comprises a first flue gas chamber (8a) for heating the second converter (3) and a second flue gas chamber (8b) downstream from the first flue gas chamber for heating the first converter (2), and wherein the heating stream (6) that flows through the first flue gas chamber (8a) flows completely in a counterflow direction to the flow of matter (4) in the second converter (3); a second heating element (9) provided with an inlet opening (12) and an outlet opening (11) that is flowed-through by the heating stream for a heating at least one of the first and second converters, wherein the second heating element is located between the first and second converters; and
    flaps for closing each of the inlet opening (12) and the outlet opening (11) of the second heating element, such that the second heating element (9) forms a thermal separation between the first converter (2) and the second converter (3) when the inlet opening (12) and the outlet opening (11) are closed by the flaps during at least one operating phase.

10. A motor vehicle with a fuel cell assembly, wherein the fuel cell assembly comprises:
    a fuel cell unit and an apparatus (1) for converting a hydrocarbon-containing flow of matter (4) to a hydrogen-enriched fluid flow (10), wherein the apparatus (1) comprises a heating apparatus (5) for production of a heating stream (6);
    a first converter (2) and a second converter (3) arranged behind said first converter in a flow direction to the hydrogen-enriched fluid flow (10), wherein each of the first converter and the second converter is configured for reforming hydrocarbons to hydrogen, and wherein the flow of matter (4) containing hydrocarbons is converted in the first converter first and in the second converter further to the hydrogen-enriched fluid flow; a first heating element (8) provided with an inlet opening and an outlet opening that is flowed-through by the heating stream for heating at least one of the first and second converters (2, 3), wherein the first heating element comprises a first flue gas chamber (8a) for heating the second converter (3) and a second flue gas chamber (8b) downstream from the first flue gas chamber for heating the first converter (2), and wherein the heating steam (6) that flows through the first flue gas chamber (8a) flows completely in a counterflow direction to the flow of matter (4) in the second converter (3); a second heating element (9) provided with an inlet opening (12) and an outlet opening (11) that is flowed-through by the heating stream for heating at least one of the first and second converters, wherein the second heating element is located between the first and second converters; and flaps for closing each of the inlet opening (12) and the outlet opening (11) of the second heating element, such that the second heating element (9) forms a thermal separation between the first converter (2) and the second converter (3) when the inlet opening (12) and the outlet opening (11) are closed by the flaps during at least one operating phase.

11. The apparatus (1) according to claim 1, wherein the flow of matter (4) flows in the first converter in a counterflow direction relative to the flow of matter (4) in the second converter.

* * * * *